(12) United States Patent
Chen

(10) Patent No.: US 8,441,489 B2
(45) Date of Patent: May 14, 2013

(54) SYSTEM AND METHOD FOR SIFT IMPLEMENTATION AND OPTIMIZATION

(75) Inventor: Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 12/347,881

(22) Filed: Dec. 31, 2008

(65) Prior Publication Data

US 2010/0169576 A1 Jul. 1, 2010

(51) Int. Cl.
*G06F 15/80* (2006.01)
*G09G 5/36* (2006.01)
*G06K 9/46* (2006.01)

(52) U.S. Cl.
USPC .......................... 345/505; 345/557; 382/190

(58) Field of Classification Search .................. 345/501, 345/502, 505, 530, 541, 557; 382/190
See application file for complete search history.

(56) References Cited

U.S. PATENT DOCUMENTS

| 6,041,393 | A  | * | 3/2000  | Hsu .............................. | 711/157 |
| 2005/0238200 | A1 | * | 10/2005 | Gupta et al. ................. | 382/103 |
| 2009/0052780 | A1 | * | 2/2009  | Kwon et al. .................. | 382/190 |
| 2009/0324087 | A1 | * | 12/2009 | Kletter ......................... | 382/195 |

OTHER PUBLICATIONS

Eaton, Ross S., et al., "A Systems View of Scale Space", Proceedings of the Fourth IEEE International Conference on Computer Vision Systems, (2006), 9 pages.
Lowe, David G., "Distinctive Image Features from Scale-Invariant Keypoints", Computer Science Department, University of British Columbia, (Jan. 5, 2004), 28 pages.
Zhang, Qi , et al., "SIFT Implementation and Optimization for Multi-Core Systems", Dept. of Computer Science, Univ. of Science and Technology of China, Intel China Research Center, Intel Corporation, (2008), 8 pages.
Heymann, S. et al., "SIFT Implementation and Optimization for General-Purpose GPU", *Proceeding of the WSCG'07*, Plzen, Czech Republic, Jan. 2007, 6 Pages.

* cited by examiner

*Primary Examiner* — Joni Richer
(74) *Attorney, Agent, or Firm* — Blakely, Sokoloff, Taylor & Zafman LLP

(57) ABSTRACT

A method is to implement a Scale Invariant Feature Transform algorithm in a shared memory multiprocessing system. The method comprises building differences of Gaussian (DoG) images for an input image, detecting keypoints in the DoG images; assigning orientations to the keypoints and computing keypoints descriptors and performing matrix operations. In the method, building differences of Gaussian (DoG) images for an input image and detecting keypoints in the DoG images are executed for all scales of the input image in parallel. And, orientation assignment and keypoints descriptions computation are executed for all octaves of the input image in parallel.

21 Claims, 7 Drawing Sheets

US 8,441,489 B2

SYSTEM AND METHOD FOR SIFT IMPLEMENTATION AND OPTIMIZATION

BACKGROUND

Scale Invariant Feature Transform (SIFT) may be utilized to detect and extract local feature descriptors that may be invariant to changes in, e.g., illumination, image noise, rotation, scaling, viewpoint. For example, SIFT may be applied to computer vision problems, including, e.g., object or scene recognition, face recognition, object detection, images match, 3-dimension structure construction, stereo correspondence, and motion tracking. SIFT may be a time-consuming task. Also, there are some scenarios (e.g. online object recognition) that may require SIFT features to be extracted and matched in real-time or even in super-real-time. SIFT feature extraction may be implemented or accelerated on graphics processing unit. However, SIFT algorithm is serial and designed for single processor system. Straightforward parallelization of the algorithm may deteriorate scaling performance due to load imbalance.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques that may implement and optimize SIFT algorithm. The implementation of the techniques is not restricted in multi-core or shared-memory multi-processor (SMP) environment; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
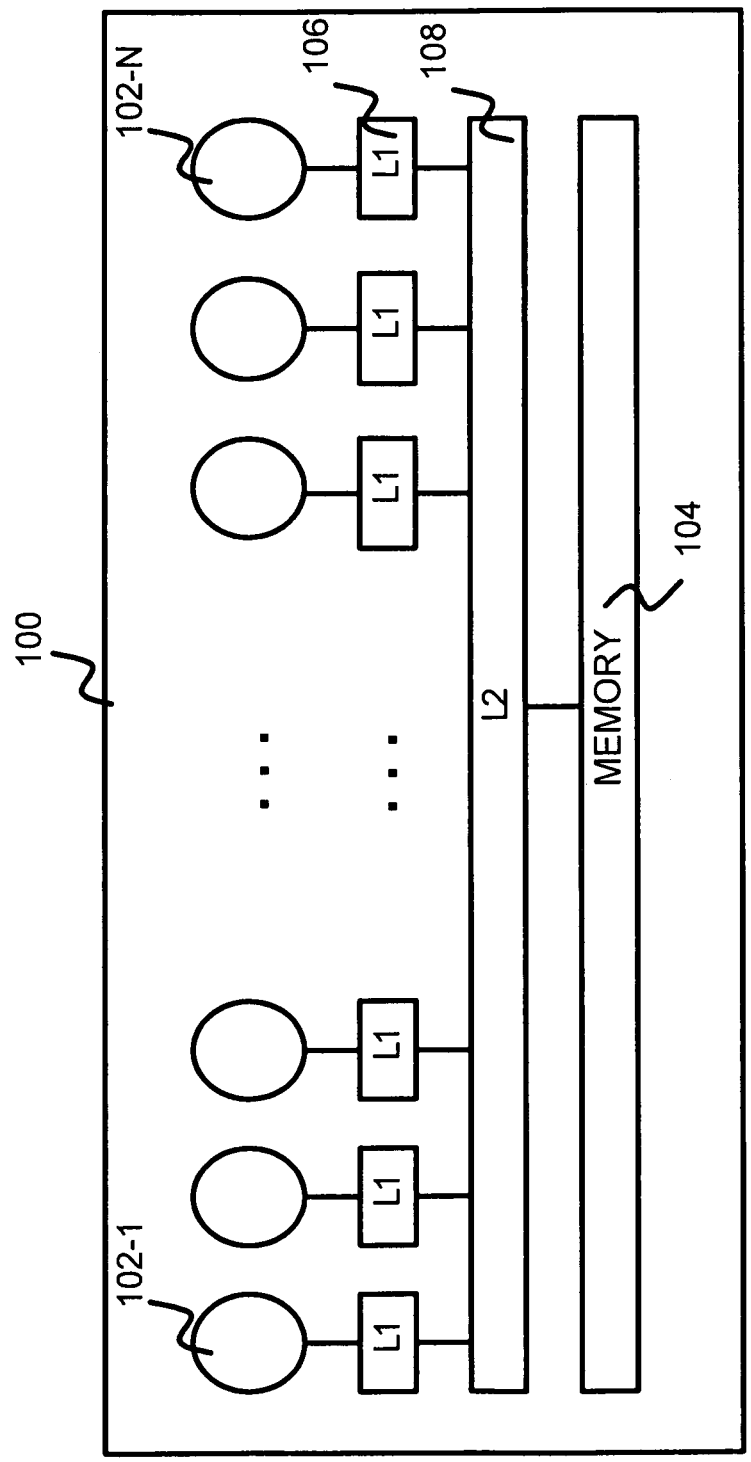
FIG. 1 is a schematic diagram of an embodiment of a multi core based system.

Referring to FIG. 1, it is illustrated an embodiment of a system 100 that may comprise a multi-core processor based system. In one embodiment, the system 100 may comprise one or more cores 102-1 to 102-N, wherein N may represent any integer. The cores 102-1 to 102-N may be interconnected through a ring or a mesh. The cores 102-1 to 102-N may perform actions in response to executing instructions. For example, cores 102-1 to 102-N may executes programs, perform data manipulations and control tasks in the system 100. The cores 102-1 to 102-N may be any type of processor adapted to perform operations in memory 104. For example, cores 102-1 to 102-N may be a microprocessor, a digital signal processor, a microcontroller, or any other processors. In one embodiment, the cores 102-1 to 102-N may not be dedicated to the use of memory 104, and the cores 102-1 to 102-N may perform operations in memory 104 while also performing other system functions.

In one embodiment, the system 100 may further comprise one or more first-level caches 106 and one or more second-level caches 108 that may couple the one or more cores 102-1 to 102-N to memory 104. In one embodiment, a first-level cache 106 may correspond to a corresponding core 102. In another embodiment, the second-level cache 108 may be shared by one or more of the cores 102-1 to 102-N. In one embodiment, cores 102-1 to 102-N may perform at least a portion of the flow of FIG. 2 in parallel or simultaneously. In one embodiment, a thread may be assigned to a core 102 together with a first-level cache 106 and a second-level cache 108 to perform at least a portion of the flow of FIG. 2 or 6 in parallel. While FIG. 2 illustrates that system 100 may comprise the second-level cache 108 as a last level cache (LLC), in some embodiments, the system 100 may further comprise a third-level cache (not shown) as a last level cache.

Figure 2:
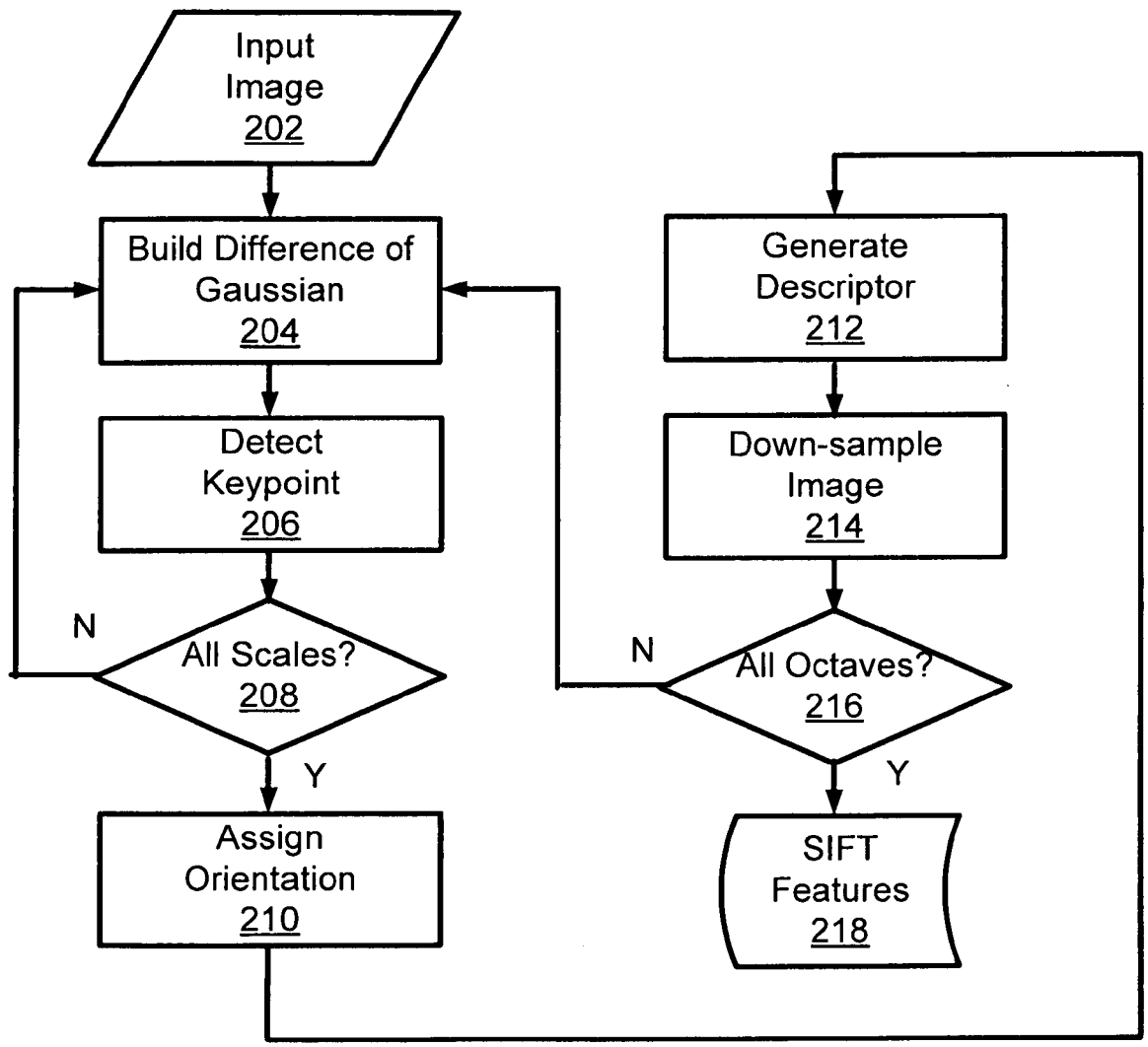
FIG. 2 is a flow chart of a method in accordance with some embodiments of the invention.

FIG. 2 illustrates an embodiment of a method that may be executed by, e.g., system 100 of FIG. 1. In some embodiments, the method may be used in 3-dimension reconstruction, image retrieval, object recognition, scene reconstruction, visual navigation, game and virtual reality, tactics, attach and defense time distribution statistics, motion analysis, video content enrichment, virtual content and/or advertisement insertion, camera calibration, or any other aspects in computer vision. In one embodiment, in block 202, an image may be inputted into the system 100. In block 204, the input image may be convolved with a Gaussian kernel to build a scale space for the input image. For example, the convolution may be a two-dimensional convolution. In one embodiment, interest points for SIFT features may correspond to one or more local extrema of difference-of-Gaussian (DoG) filters at different scales. In block 202, a DoG filter may further be calculated. In one embodiment, one more more core 102 may each execute one or more threads to process at least a portion of input data of the image in parallel or simultaneously.

In one embodiment, according to equation (1), a scale space of an original image may be generated from the convolution of a Gaussian kernel with the image:

$$L(x,y,\sigma) = G(x,y,\sigma) * I(x,y) \tag{1}$$

wherein $L(x, y, \sigma)$ may represent a scale space of the input image at a scale a, $G(x, y, \sigma)$ may represent a Gaussian kernel at a scale $\sigma$, $I(x, y)$ may represent the original image, "*" may indicate a two-dimensional convolution. In one embodiment, a series of successive convolution by two-dimensional Gaussian kernels at different scales may be used to construct a set of scale spaces from a single input image. In one embodiment, a scale space may correspond to a Gaussian-blurred image. In one embodiment, each of one or more threads in system 100 may perform a convolution in parallel.

In another embodiment, the Gaussian kernel $G(x, y, \sigma)$ may be represented by equation (2):

$$G(x, y, \sigma) = \frac{1}{(2\pi\sigma^2)} \exp^{-(x^2+y^2)/\sigma^2} \tag{2}$$

In one embodiment, a value of a (the scale of Gaussian) may be varied to obtain different Gaussian blurred images. A difference of Gaussian (DoG) image may be obtained from a result of convolving the input image with a difference-of-Gaussian filter:

$$D(x,y,\sigma) = (G(x,y,k\sigma) - G(x,y,\sigma)) * I(x,y) = L(x,y,k\sigma) - L(x,y,\sigma) \tag{3}$$

where $D(x, y, \sigma)$ may represent the difference of the Gaussian-blurred images at scales $\sigma$ and $k\sigma$. In one embodiment, the calculation of DoG images may be performed in parallel in system 100. In one embodiment, since the DoG image may not be written into the input image, a copy of the input image may not be kept. In one embodiment, the result of block 204 may be saved to a new data array that may be shared by two or more threads. In one embodiment, the new data array may be kept in the LLC of system 100 if the LLC is large enough. In another embodiment, there may not be contest among the threads.

Figure 3:
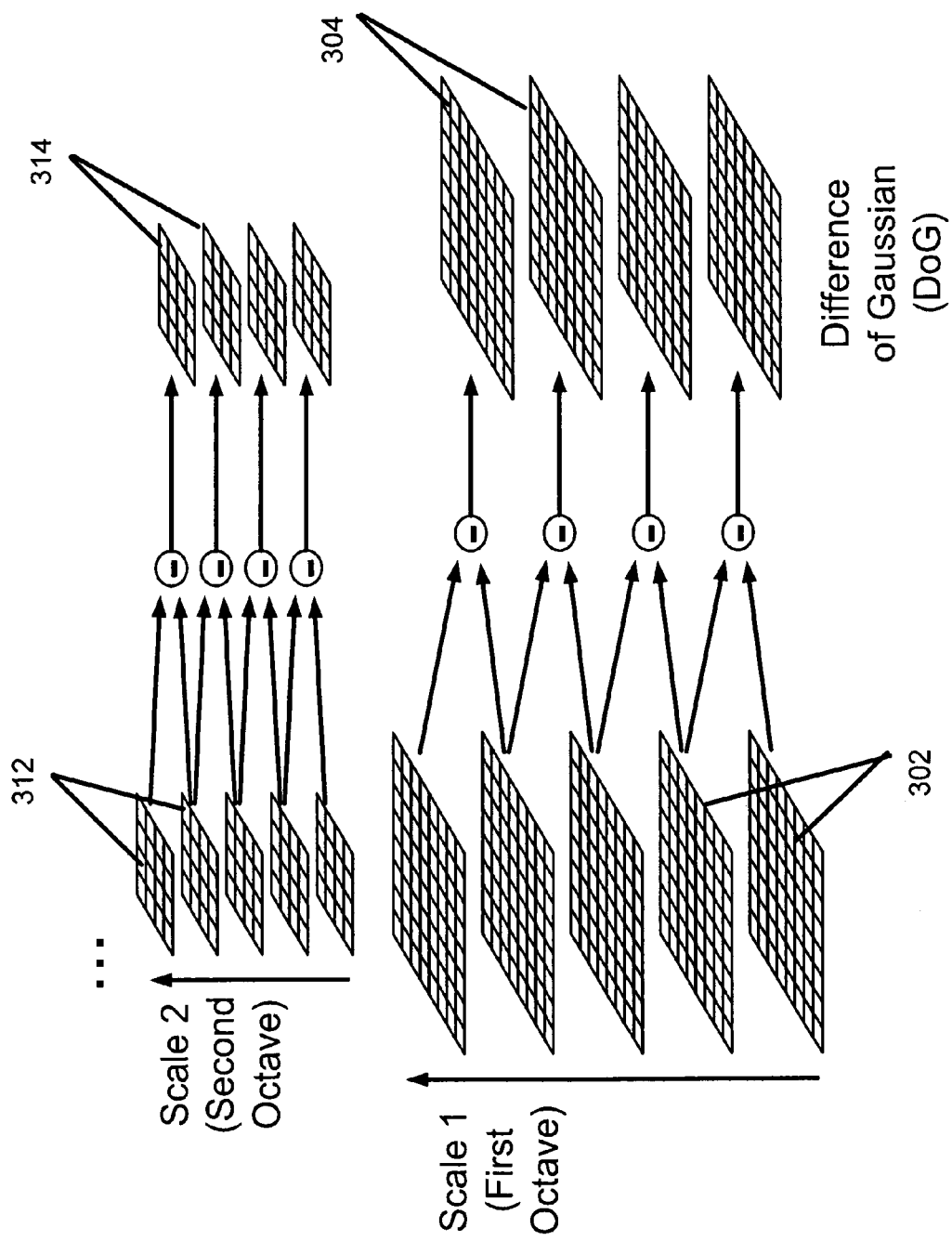
FIG. 3 is a schematic diagram of an embodiment of an octave.

FIG. 3 illustrates a schematic diagram of Gaussian-blurred images and DoG images that may correspond to an octave for according to an embodiment. While FIG. 3 shows two octaves, in some embodiments, more octaves may be obtained. In one embodiment, for each octave of scale space, the initial image may be convolved with a set of Gaussian kernels to produce a set of scale space images as shown on the left of FIG. 3, e.g., 302 and 312. Each set of convolved images may be grouped into an octave.

For example, for the first octave, an original image may be convolved with a set of one or more Gaussian kernels to obtain a set of one or more Gaussian images 302. A subtraction may be made on adjacent Gaussian images 302 to obtain a difference-of-Gaussian image 304. Referring to FIG. 3, Gaussian images 302 for the first octave may be down-sampled by a factor of 2 to obtain a set of Gaussian images 312 for a second octave. Gaussian images of each octave may be similarly down-scaled by a factor of 2 to obtain a set of Gaussian images for the next octave. In one embodiment, a subtraction may be made on adjacent Gaussian images 312 of the second octave to obtain a set of DoG images 314 for the second octave. Similar subtraction may be performed on adjacent Gaussian images of each octave to obtain DoG images of the octave.

In one embodiment, an octave may be a doubling of standard deviation of the first image in the sequence. In one embodiment, each octave may have a fixed number of Gaussian images and/or a fixed number of DoG images. While FIG. 3 illustrates five Gaussian images 302 and four DoG images 304 for each octave; however, in some embodiments, a different number of Gaussian images and DoG images may be contained in an octave.

Figure 4:
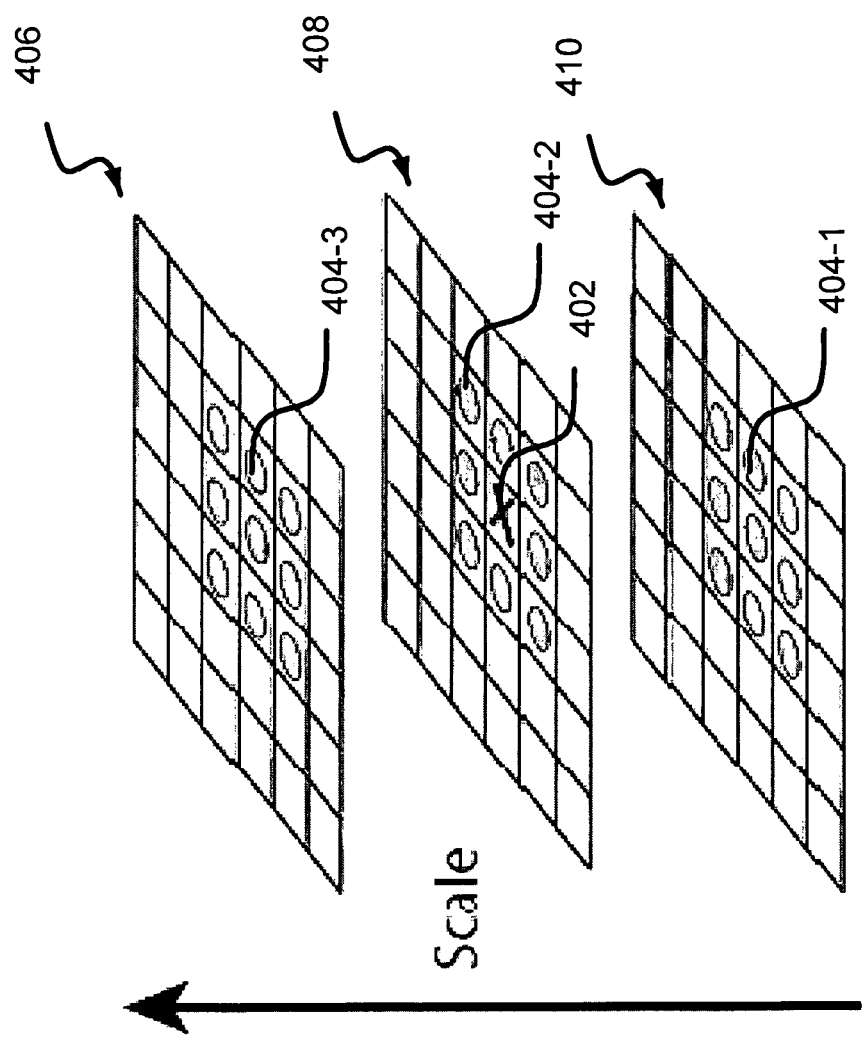
FIG. 4 is a schematic diagram of an embodiment of a sample point and its neighboring points.

Referring again to FIG. 2, in block 206, a keypoint may be detected from the corresponding DoG images across scales. In one embodiment, the core 102 may compare each pixel in a DoG image to its neighboring pixels in a region around the pixel. FIG. 4 illustrates a schematic diagram of an embodiment of DoG images for a set of three adjacent scales. In one embodiment, each sample pixel 402 (marked with "X" in FIG. 4) may be compared to its eight neighbors (marked with circles in FIG. 4) in the current image and nine neighbors (marked with circles in FIG. 4) in the scales above and below the current image.

Referring to FIG. 4, it is illustrated a current scale image 408 and two adjacent scales 406 and 410 respectively above and below the current scale image 408. In one embodiment, the sample pixel 402 may be compared to 26 neighboring pixels that are adjacent to the sample pixel 402 in a region of 3×3 pixels on each of the current scale 408 and adjacent scales 406 and 410. For example, 404-1 may represent a pixel, on a previous scale 410, that is adjacent to the current pixel 402. 404-2 may represent a pixel, on a current scale 408, that is adjacent to the current pixel 402. 404-3 may represent a pixel, on a next scale 406, that is adjacent to the current pixel 402.

In block 206, it may be determined if the sample pixel 402 is a local extremum as compared with the neighboring pixels of the sample pixel 402. For example, each pixel of a scale may be compared its the neighboring pixels in the scale and adjacent scales to detect if the pixel is a keypoint. In one embodiment, if the comparison (block 206) shows the current pixel 402 is a maximum or minimum as compared with its neighboring pixels, the current pixel 402 may be selected as a candidate keypoint. In contrast, if the current pixel 402 is not a local maximum or minimum, the current pixel 402 may be removed. The detection of block 206 may further remove the detected candidate keypoints with low contrast and may eliminate responses along edges. In block 206, the localizations of the detected keypoints may be saved in a keypoint list.

In one embodiment, a data partition method may be utilized to detect a keypoint. In another embodiment, synchronization among threads may be performed to push a detected keypoint to the keypoint list that may be shared by the threads. For example, a lock may be used as a thread push a keypoint to the keypoint list. In another embodiment, a lock-free mechanism may be used to reduce synchronization overhead. For example, the shared keypoint list may be duplicated into one or more private or local lists. A thread may operate on its local list non-exclusively to avoid mutual access of the shared list. The local lists may be merged at the end of the parallel region.

In block 208, the system 100 may determine if all the scale images of an octave have been detected. If it is determined that all the scales have been detected, the flow may proceed to block 210. Contrarily, if the detection on any scale image has not been performed, the flow may return to block 204. In block 210, an orientation may be assigned to each keypoint based on local image properties so that the keypoint descriptor may be represented relative to the orientation and may achieve invariance to image rotation.

In one embodiment, the orientation of a keypoint may be formed from a gradient orientation histogram of sample points within a region around the keypoint in the Gaussian images that are the closest scale or adjacent to the keypoint's scale. For example, the sample points may be the neighbors of the keypoint. In one embodiment, each sample point added to the histogram may be weighted by its gradient magnitude and by a Gaussian-weighted circular window with a σ that may be 1.5 times that of the scale of the keypoint. In one embodiment, the orientation histogram may comprise 36 bins that may cover 360 degree range of orientations.

Peaks in the histogram may correspond to dominant orientations of local gradients. The highest peak in the histogram may be detected. A keypoint is created for the dominant orientation that corresponds to the highest peak and any other direction that corresponds to the local peak within 80% of the highest peak, respectively. In one embodiment, for locations with multiple peaks of similar magnitude, there may be multiple keypoints created at the same location and scale but different orientations.

In block 210, a keypoint may be assigned an image location, scale, and orientation. The parameters may impose a repeatable local 2D coordinate system in which to describe the local image region, and therefore may provide invariance to the parameters. In block 212, a feature descriptor for each keypoint may be computed. In one embodiment, the gradient magnitude and orientation at each image sample point 504 (FIG. 5A) in a region around the keypoint location may be computed. In one embodiment, the region may comprise a set of 4×4 neighboring pixels or sample points 504 around the keypoint location. The computed gradient magnitudes and orientations are weighted by a Gaussian window 502.

Figures 5A, 5B:
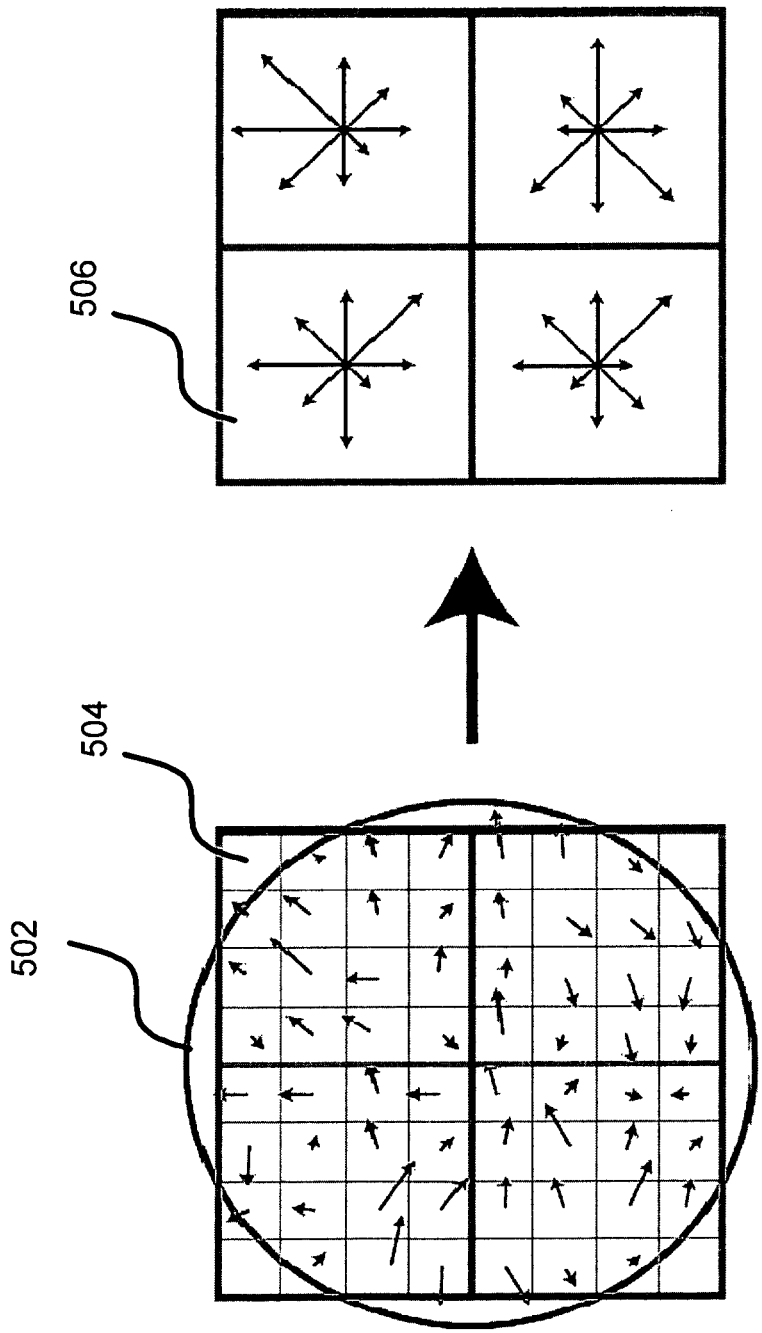
FIG. 5 is a schematic diagram of an embodiment of an orientation and a keypoint descriptor.

In block 212, the sample gradient magnitudes and orientations may further be accumulated into a set of orientation histograms to obtain the feature descriptor, as shown in FIG. 5B. For example, in the example of the FIG. 5B, the set of orientation histograms may comprise four orientation histograms 506 that may each summarize the contents over a subregion of 4×4 neighboring pixels, as shown in FIG. 5A. Referring to FIG. 5B, the length of each arrow may correspond to the sum of the gradient magnitudes in proximity to the corresponding direction within the subregion. An orientation histogram 506 may comprise 8 bins. In the embodiment of FIG. 5B, a feature descriptor may comprise an array of 2×2 histograms around the keypoint. A SIFT vector may be obtained with 4×4×8=128 elements. The vector may further be normalized to enhance invariance to change in illumination.

In blocks 210 and 212, the keypoints may be dynamically scheduled to the working threads to achieve parallel processing. In another embodiment, the keypoints detected from all scales of an octave may be gathered. The feature descriptor for each of the detected keypoints may be calculated in parallel to reduce load imbalance.

In block 214, one or more matrix operations for image processing may be performed, including, e.g., matrix subtraction and image down-sample. Since the loop iterations of the matrix operations may be independent, the matrix operations in this module may be parallelized by using the data parallelism. In block 216, it may be determined if all octaves has been processed. If not, the flow of FIG. 2 may return to block 204. Contrarily, the flow may go to block 218 to output the obtained SIFT features.

Figure 6:
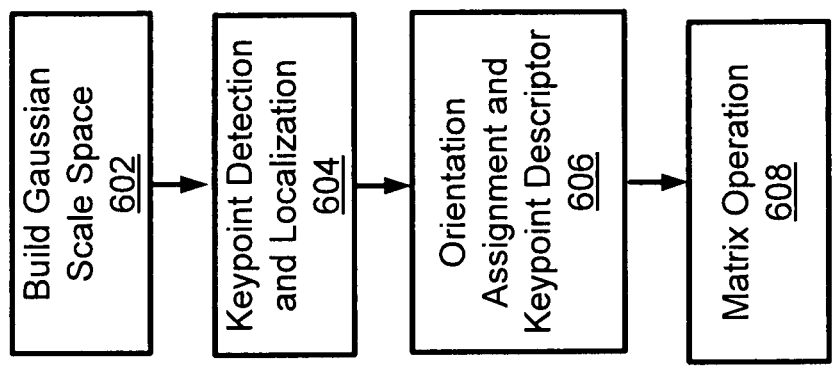
FIG. 6 is a flow chart of a method in accordance with some embodiments of the invention.

Based on the flow of FIG. 2 or 6, a method to implement a parallel SIFT algorithm with OpenMP may be obtained. The OpenMP may be an application program interface (API) that may be used to direct multi-threaded shared memory parallelism; however, in some embodiments, other implementation may be utilized to achieve parallelism. The following is the pseudo code to implement the parallel SIFT algorithm.

```
for all octaves
{
    List keypoint_list;
    for all scales
    {
        ConvolveImageGaussianParallel( );
        BuildDoGParallel( );
        //Detect Keypoint
        #pragma omp parallel for
        for all pixels p in Image
        {
            if( IsKeypoint(p) )
                #pragma omp critical
                keypoint_list.add(p);
        }
    }
    #pragma omp parallel for
    for all pixels kp in keypoint_list
    {
        ExtractFeature(kp);
    }
    DownSampleImageParallel( );
}
```

FIG. 6 is a schematic diagram of an embodiment of a method to implement the parallel SIFT algorithm. In block 602, space scales may be built for an octave. In block 602, calculation of Gaussian images and DoG images may be performed in parallel. A keypoint-list may be assigned to the octave. In block 604, keypoints from each scale in this octave may be detected. The detected keypoints may be collected to the keypoint-list and the keypoints from next scale may be detected. In one embodiment, the keypoint detection of block 604 may be performed in parallel. The keypoints for the octave may be gathered to produce a keypoint-list, in which the keypoints may be dynamically scheduled to threads for parallel orientation assignment and feature extraction in block 606. In block 608, matrix operations, including, e.g., matrix subtraction and image down-sample, may be performed in parallel. In one embodiment, the flow of FIG. 6 may be applied to all octaves. In one embodiment, the load imbalance of orientation assignment and keypoint descriptor module may be reduced.

In one embodiment, one or more serial and/or parallel optimization may be used in the method of FIG. 2 or FIG. 6. For example, loop fission may be used to break a big loop into two or more smaller loops to improve memory locality and eliminate data dependences. In one embodiment, cycles in a loop may be changed, e.g., combine, reorder, to two or more loops each with a smaller number of cycles. In another embodiment, cache-conscious optimization may be used to improve data locality. In some embodiments, the method of FIG. 2 or FIG. 6 may comprise to convolve each row and each column of the input image with Gaussian filter. However, in some embodiments, the data may be accessed in the rows order to reduce bad cache performance caused by the nested loop in the columns order. In some embodiments, Gaussian and/or DoG image may not be written into the input image to remove memory copy operation and reduce bandwidth demand and contest among threads. In another embodiment, single-instruction multiple-data (SIMD) may be utilized for float-point computations (such as in blocks 602 and 608) in the flow of FIG. 2 or FIG. 6 to take advantage of data level parallelism (DLP) architecture features of system 100.

In some embodiments, some threads may not be totally independent. For example, all threads may push the keypoints to one shared point list, for which synchronization may be added to maintain the execution order of the threads. The synchronization may be presented in the form of critical section, lock, and barrier in the OpenMP or other parallelism implementation. In some embodiments, synchronization may be utilized in the keypoint detection and localization to employ a lock when threads push a keypoint into the keypoint list.

In some other embodiments, a lock-free mechanism may be utilized in the keypoint detection and localization to reduce the synchronization overhead. For example, the shared keypoint list may be replicated into several private lists. Each thread may operate on its local list non-exclusively to avoid the mutual access of the shared list. The local lists may be merged at the end of parallel region. In some embodiments, buffer manipulation for each thread may be conducted outside a parallel region to reduce memory allocation/deallocation operations that may cause severe lock contentions in the heap. These requests may be substantially runs in serial in a parallel region; however, in some embodiments, the buffer manipulation may not be used in a praralle region.

In some embodiments, the memory references by the individual cores or threads may be to different non-shared cache lines to remove false sharing. For example, in one embodiment, each thread's data element may be padded to ensure that elements owned by different threads may lie on separate cache lines to reduce a cache miss and memory latencies. For example, in some embodiments of the method of FIG. 2 or FIG. 6, keypoints may be dynamically schedule to different threads for computing features. In some embodiments, each feature vector of a keypoint may be expanded with a blank space (e.g., 128 bytes) to force the threads not to share cache lines and to reduce false sharing between threads. In some embodiments, a size of a feature vector may be adjusted based on a size of a cache line. For example, a feature factor may be expanded to comprise a number of bytes the same as that of a cache line.

In another embodiment, some multi-core processors may have a non-uniform cache architecture (NUCA). The communication latency between different cores may vary depending on its memory hierarchy. In one embodiment, thread affinity mechanism may be applied in a multi-core or multi-processor system to attach one thread to a core in the system. For example, a group of threads that has high data sharing behavior may be scheduled to the same cluster to utilize the shared cache for data transfer. In one embodiment, a cluster may be a collection of closely-coupled cores. For example, two cores sharing the same L2 cache in a multi-core processor may be called as a cluster. However, in some embodiments, for applications with high bandwidth demands, the threads may be scheduled on different clusters to utilize aggregated bandwidth.

In another embodiment, after the row-based parallelization in the SIFT application, the image chunk assigned to one thread/core may be used by the other threads. Coherence traffic may occur if the image data does not reside in cores sharing the same last-level cache. Thread scheduling in the same cluster may mitigate the data transfer between loosely-coupled cores that may not reside in the same cluster. The thread affinity mechanism may improve the cache performance, and minimize the thread migration and context switches among cores. The thread affinity mechanism may also improve the data locality performance and mitigates the impact of maintaining the cache coherency among the cores/processors.

While the method of FIGS. 2 and 6 are illustrated to comprise a sequence of processes, the method in some embodiments may perform illustrated processes in a different order. In some embodiments, the flow of FIG. 2 may be performed on each frame in a simultaneous manner. While the flow of FIG. 2 may be illustrated to process a certain amount of data, in some embodiments, a different amount of data may be processed.

Figure 7:
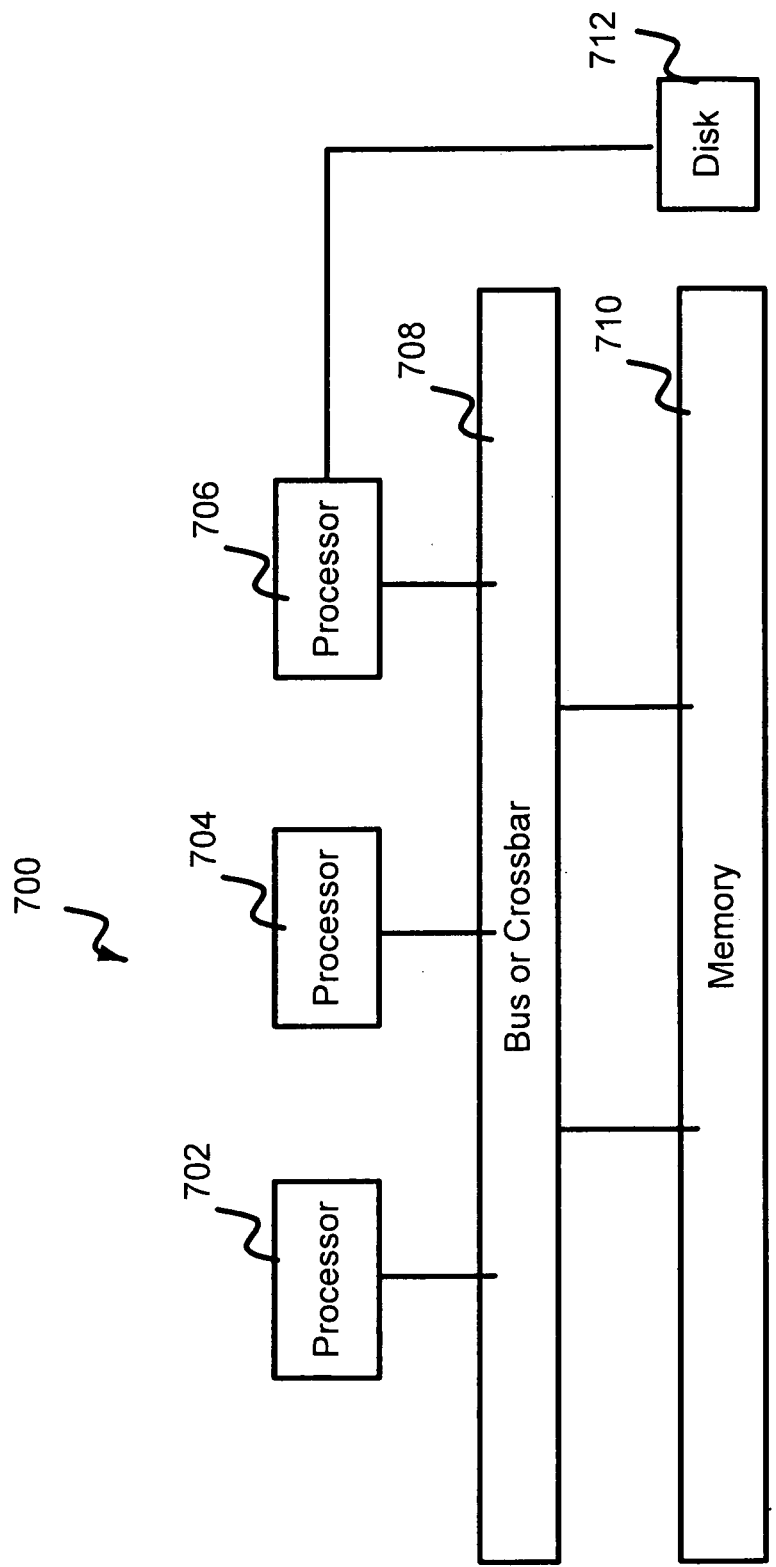
FIG. 7 is a schematic diagram of an embodiment of a multiprocessor based system.

While the system of FIG. 1 is illustrated to comprise a number of cores, in some embodiments, other multi-core system or shared-memory multiprocessor system may be utilized. For example, FIG. 7 illustrate an embodiment of a symmetric multiprocessing (SMP) based system 700. While the system of FIG. 1 is illustrated that the cores may share the second level cache, in some embodiments, a different cache sharing may be applied.

In the system 700, processors 702 to 706 may be connected to a single shared main memory 710; however, some embodiments may comprises a different number of processors, e.g., two or more, that may connect to a single shared main memory. In another embodiment, the SMP architecture may be applied to a multi-core system with a core be regarded as a processor. In some embodiments, any other shared memory multiprocessing system with two or more processors or processing modules may be utilized.

In one embodiment, the system 700 may allow any of the processors 702 to 706 to work on any task no matter where the data for that task is located in the memory 710. In another embodiment, the system 700 may move tasks among processors 702 to 706 to balance the work load. In some embodiments, non-uniform memory access (NUMA) may be used in the system 700 where different memory banks (not shown) may be assigned to different processors 702 to 706. In the NUMA architecture, processors 702 to 706 may access a local memory and a remote memory. Memory throughput may be improved if the data is localized to a processor (and thus the other processors).

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system, comprising:
   a memory;
   two or more cores that shares the memory to perform in parallel a scale invariant feature transform algorithm on scales of a first octave of an image, wherein in response to detecting that keypoints in a plurality of difference of Gaussian images for all scales of the first octave of the image are obtained, at least two cores each is to perform a thread in parallel to generate feature factors for the obtained keypoints in the first octave, and in response to detecting that feature factors are obtained for the first octave, at least two cores each is to perform in parallel a scale invariant feature transform algorithm on scales of a second octave of the image and to generate feature factors for keypoints detected for a plurality of difference of Gaussian images for the scales of the second octave.

2. The system of claim 1, further comprising:
a set of first level cache, each core being coupled to the memory by a first level cache.

3. The system of claim 2, further comprising:
a second level cache that couples each first level cache to the memory.

4. The system of claim 1, wherein each thread operates on its local list of keypoints, and the local lists of keypoints are merged at an end of a parallel region.

5. The system of claim 1, wherein buffer manipulation for each thread is conducted outside a parallel region.

6. The system of claim 1, wherein two or more cores each perform at least a thread to compute one or more Gaussian images of the first octave.

7. The system of claim 6, wherein two or more cores each perform subtraction on adjacent Gaussian images of the first octave to obtain difference-of-Gaussian images of the first octave in parallel.

8. A method to implement a scale invariant feature transform algorithm by a computing device, comprising:
building in parallel difference of Gaussian images for all scales of a first octave of an image that is input to the computing device;
detecting keypoints with a local extrema in the difference of Gaussian images for the first octave in parallel;
assigning orientations to the keypoints, in response to determining that keypoints are detected for all scales of the first octave; and
computing feature descriptors for the keypoints for the scales of the first octave;
building in parallel difference of Gaussian images for scales of a second octave of the image, in response to determining that the feature descriptors are computed for the keypoints for all the scale of the first octave; and
computing in parallel feature descriptors for keypoints detected for the difference of Gaussian images for the second octave scales of a second octave of the image.

9. The method of claim 8, wherein the data of the input image is accessed in an order of rows.

10. The method of claim 8, further comprising:
down-scaling the Gaussian images of the first octave to obtain a set of Gaussian images for the second octave of the image.

11. The method of claim 8, wherein building difference of Gaussian images comprises a set of threads that each operate on a local list, the local lists of the set of threads are merged at an end of a parallel region.

12. The method of claim 8, wherein a size of a feature descriptor is adjusted based on a size of a cache line of data.

13. The method of claim 8, wherein the threads associated with assigning orientations to the keypoints are performed in parallel.

14. The method of claim 8, further comprising dynamically scheduling the keypoints to the threads in computing feature descriptors.

15. A non-transitory machine readable medium comprising a plurality of instructions that in response to being executed result in a computing device
building difference of Gaussian images for all scales of a first octave of an input image in parallel;
detecting keypoints with a local extrema in the difference of Gaussian images for all the scales of the first octave in parallel;
assigning in parallel orientations to the keypoints, in response to determining that keypoints are detected for all the scales of the first octave;
computing in parallel feature descriptors for the keypoints for the scales of the first octave;
detecting keypoints with a local extrema in difference of Gaussian images for scales of a second octave in parallel; and
computing in parallel feature descriptors for the keypoints for the scales of the second octave.

16. The non-transitory machine readable medium of claim 15, further comprising a plurality of instructions that in response to being executed result in a computing device
down-scaling the Gaussian images of the first octave to obtain a set of Gaussian images for the second octave of the image.

17. The non-transitory machine readable medium of claim 15, wherein the data of the input image is accessed in an order of rows.

18. The non-transitory machine readable medium of claim 15, wherein building difference of Gaussian images comprises a set of threads that each operate on a local list, the local lists of the set of threads are merged at an end of a parallel region.

19. The non-transitory machine readable medium of claim 15, wherein a size of a feature descriptor is adjusted based on a size of a cache line of data.

20. The non-transitory machine readable medium of claim 15, wherein, wherein the threads associated with assigning orientations to the keypoints are performed in parallel.

21. The non-transitory machine readable medium of claim 15, further comprising a plurality of instructions that in response to being executed result in a computing device
dynamically scheduling the keypoints to the threads in computing feature descriptors.

* * * * *